P. CARPENTER.
BAKING PAN.
APPLICATION FILED OCT. 4, 1915.
1,304,740.
Patented May 27, 1919.
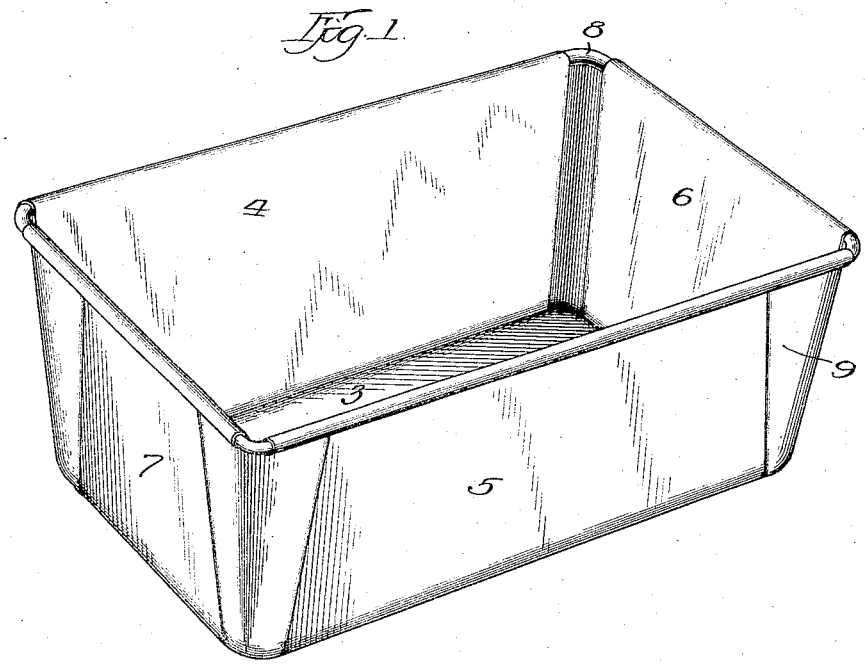
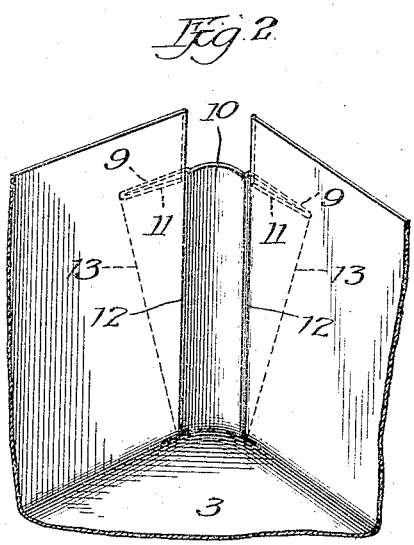
Witnesses:
Inventor
Paul Carpenter

UNITED STATES PATENT OFFICE.

PAUL CARPENTER, OF GLENVIEW, ILLINOIS.

BAKING-PAN.

1,304,740.  Specification of Letters Patent.  Patented May 27, 1919.

Application filed October 4, 1915. Serial No. 54,032.

*To all whom it may concern:*

Be it known that I, PAUL CARPENTER, a citizen of the United States, and a resident of Glenview, in the State of Illinois, have invented certain new and useful Improvements in Baking-Pans, of which the following is a specification.

My present invention relates to improvements in pans, and has particular reference to pans made by bending a flat sheet of material adjacent each corner of the pan in order to avoid cutting the material and so produce a seamless fluid-tight pan without drawing the material composing the pan into the desired form.

The principal objects of my present invention are to provide a pan with rounded corners, and generally to improve, simplify and cheapen the construction and manufacture of such pans.

In overcoming certain disadvantages referred to and in attaining the following objects and certain additional objects to be below disclosed I have provided the construction illustrated in the accompanying drawings, wherein—

Figure 1 is a perspective view of the finished pan as a whole and Fig. 2 is a perspective view of one corner of the pan before the upper rim has been formed thereon.

On inspection of the drawings it will be seen that the pan comprises a bottom portion 3, side portions 4 and 5, and end portions 6 and 7. The upper edges of the portions 4 and 5, 6 and 7 are curled over so as to embrace a rod or wire 8 and thereby form the rim of the pan, which not only strengthens the upper edges of the pan, but also serves to keep the folds 9 in position. These folds 9 consist of an outer ply 10 and an inner ply 11, the inner ply being connected to the side and end members respectively along the lines of crease 12. The lines of crease 12 are preferably arranged parallel as shown in order to produce a rounded corner where the side, end and bottom portions meet. Whether the folds 12 are arranged parallel or not, they should be spaced apart at their lower ends in order to produce the desired rounded corner.

In manufacturing the pan I prefer to stamp a blank of the required dimensions having cutaway portions adjacent each corner, as indicated in Fig. 2, in order to avoid the material forming the fold passing over the rod or wire 8. After the blank has been stamped, it is preferably creased adjacent each corner along the lines 12 and simultaneously cupped. When these creases have been formed and the side and end portions have been brought into the desired angular position with respect to the bottom of the pan, the outer plies 10 of the folds are pressed against the pan, and the creases or folds 13 produced. When the folds 9 have been brought snugly against the walls of the pan the upper edge of the side and end portions of the pan is bent around the rod or wire 8 so as to grip the upper edge of the fold 9 between the side or end portions and the rod 8. Preferably those portions of the outer plies 10 which are between the folded edges 12 are pressed inward until the inner surface of such portions are substantially continuations of the inner surface of the walls of the pan, as shown in Fig. 2.

The pan is then ready for use without further treatment.

Having thus described my invention and illustrated its use, what I claim as new and desire to secure by Letters Patent is:—

1. A pan having its walls folded outwardly and reflexly adjacent each corner along two lines substantially parallel and spaced apart a considerable distance, the plane in which both the lines lie intersecting the planes of the adjacent walls at substantially 135 degrees whereby rounded corners are produced.

2. A pan having its walls folded adjacent each corner along two lines substantially parallel and spaced apart a considerable distance, the plane in which both the lines lie intersecting the planes of the adjacent walls at substantially 135 degrees whereby rounded corners are produced.

3. A pan formed from a flat sheet of material folded upon a plurality of pairs of lines, each pair of lines being converging and meeting at their lower ends, while the meeting point of one pair of lines is spaced apart from the meeting point of the adjacent pair of lines, the line joining the two meeting points intersecting the planes of the adjacent walls at substantially 135 degrees, whereby rounded corners are produced.

4. A pan having its walls folded outwardly and reflexly adjacent each corner along two lines spaced apart at one end, the portions of the outer folds between the said lines of fold being pressed inwardly whereby the inner surfaces of such portions are substantially continuations of the inner surfaces of the walls of the pan.

In testimony whereof I have hereunto signed my name in the presence of the two subscribing witnesses.

PAUL CARPENTER.

Witnesses:
DONALD C. WILLIAMS,
HUGH L. BURNHAM.

Copies of this patent may be obtained for five cents each, by addressing the "Commissioner of Patents, Washington, D. C."